May 4, 1926.
J. M. CONLEY
1,583,390
DEMOUNTABLE GROUTER ATTACHMENT FOR TRACTORS
Filed March 18, 1925
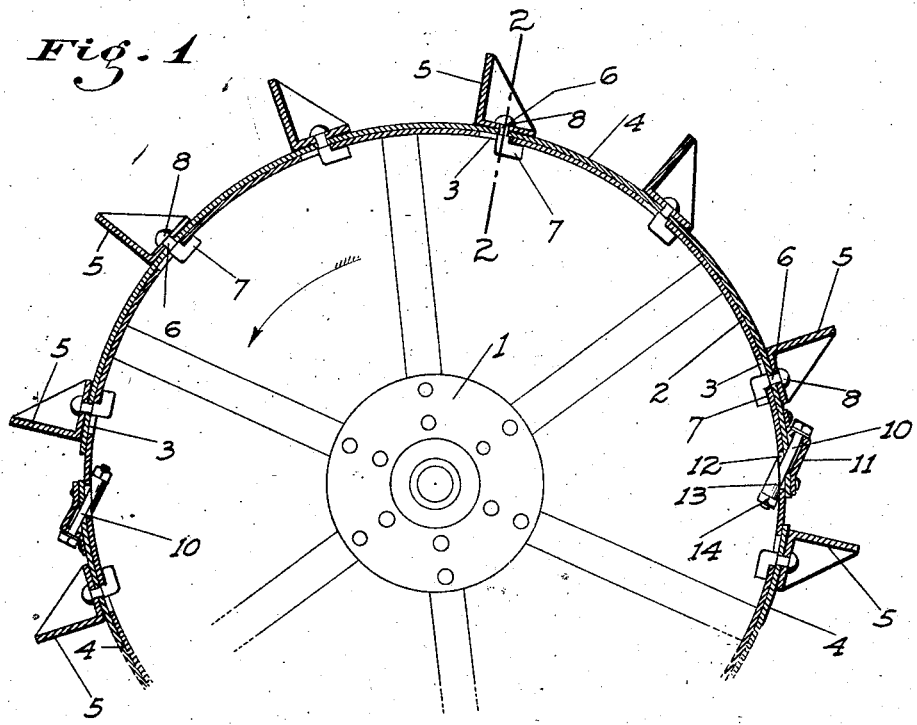
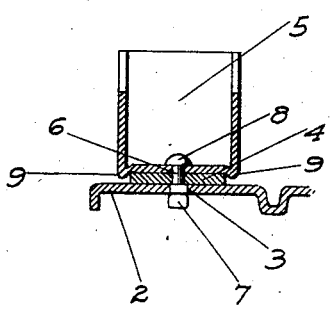
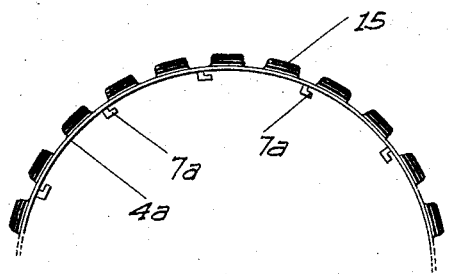
INVENTOR
John M. Conley
BY
ATTORNEY Patented May 4, 1926.

1,583,390

UNITED STATES PATENT OFFICE.

JOHN M. CONLEY, OF STOCKTON, CALIFORNIA, ASSIGNOR OF ONE-FOURTH TO LAFAYETTE J. SMALLPAGE, OF STOCKTON, CALIFORNIA.

DEMOUNTABLE GROUTER ATTACHMENT FOR TRACTORS.

Application filed March 18, 1925. Serial No. 16,330.

*To all whom it may concern:*

Be it known that I, JOHN M. CONLEY, a citizen of the United States, residing at Stockton, county of San Joaquin, State of California, have invented certain new and useful Improvements in Demountable Grouter Attachments for Tractors; and I do declare the following to be a full, clear, and exact description of the same, reference being had to the accompanying drawings, and to the characters of reference marked thereon, which form a part of this application.

This invention relates to improvements in equipment for the wheels of tractors, and the like, when it is necessary to give them additional traction over what is provided with a plain wheel surface.

My principal object is to provide a demountable grouter attachment for such wheels in the form of a number of separated bands which together almost completely surround the wheel and on which the grouters are fixed; and to provide means for readily and easily coupling the individual bands onto the wheel in driving relation therewith and then locking the same against undesired displacement or removal.

My attachment may be applied or removed while the tractor is in the field or on the road without necessitating the wheels being jacked up.

By means of these attachments the wheels of a tractor may be suitably equipped for operation over different kinds of ground. On paved or hard surface roads for instance the attachments would be omitted entirely or bands having rubber grouters or tread pads thereon mounted on the wheels. When working in very soft ground the wheels would be equipped with bands having large grouters while for working in less difficult ground attachments having smaller grouters could be applied.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a fragmentary side elevation in section of a tractor wheel showing my grouter attachment also in section as applied thereto.

Fig. 2 is an enlarged cross section on the line 2—2 of Fig. 1.

Fig. 3 is a fragmentary view of a modified form of the device detached.

Referring now more particularly to the characters of reference on the drawings, the numeral 1 denotes the wheel of a tractor of a certain make having a rim 2, which rim, to be equipped with my attachment is left entirely plain and provided with a plurality of evenly spaced slots 3 extending in circumferential alinement about the rim.

My grouter attachment in the form shown in Figures 1 and 2 comprises separate and independent bands 4 adapted to rest on and follow the curvature of the rim, two of said bands being employed to make a complete rim-surrounding attachment.

Arranged about each band and projecting outwardly therefrom are the grouters 5 of suitable form, these being spaced apart the same distance as are the slots 3.

These grouters are each fixed onto the band by a single rivet 6 of special form, said rivets being adapted to project through the slots 3. On the inner ends of the rivets are L-heads 7 preferably square in cross section, whose length is somewhat shorter than the slots 3 and which are fixed on the bands to extend longitudinally of the slots. The rivets are shouldered where they abut against the inner face of the band so that when the heads 8 on the outer ends of the rivets are driven the grouters will be firmly clamped onto the band.

To prevent the grouters from possibly turning on the band their side edges are arranged to project over the adjacent edges of the band as shown at 9 in Fig. 2. The rivets are of such a length that when the heads are projected through the slots, they will just about abut against the inner face of the wheel rim.

To install each band it is first located on the rim so that all the rivet heads 7 project through the respective slots, with said heads facing in a direction opposite to the direction of rotation of the wheel. The band is then shifted circumferentially of the wheel so that the heads 7 pass under the rim 2 at one end of the slots. I then employ suitable means for cinching up and locking the band against retractive movement.

The means here shown comprises a bolt 10 mounted at that end of the band towards which the heads 7 face. The bolt is mounted in a bracket 11 fixed on the outer face of the band and is disposed at an obtuse angle relative to the adjacent end of the band. The bolt projects through a special slot 12 provided therefor in the rim. I then place on the inner end of the bolt a suitably cut washer 13 with a nut 14 on the bolt at the outer end of the washer. The angle at which the bolt is set is such that it is disposed as nearly tangential to the wheel as possible, so that when the nut 14 is tightened up the band will be pulled around on the rim until the rivets 6 abut against the adjacent ends of the slots. When said rivets are in this position the heads 7 will have a wedging engagement with the rim beyond the slots.

The total length of the two bands is sufficiently less than the circumference of a rim so that one band may be shifted the necessary distance about the rim one way or the other without interfering with the other band.

Two bands being used, as hereinbefore stated, one band may first be placed on the upper portion of the wheel, and the latter then rotated to bring the opposite portion uppermost for installation of the other band. This avoids the necessity of jacking the wheels up, as will be evident.

If the wheel is of the double tread type, as in some tractors, four or more bands, two or more on each tread, would be used.

In the form of attachment shown in Fig. 3 the band 4ª has a plurality of rubber pads 15 vulcanized or otherwise fixed thereon instead of the metal grouters. Regardless of the number of pads the same number and spacing of the L-head members 7ª is retained as in the first described type. This enables the latter type to be installed on the same wheel for which said first type is designed.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A grouter attachment for vehicle wheels comprising a band to abut against and follow the curvature of the rim of the wheel, grouters projecting outwardly from the band, means securing the grouters to the band, and means formed with said securing means for enabling the band to be detachably secured onto the rim against radial displacement thereon and also against relative circumferential movement in one direction.

2. A grouter attachment for vehicle wheels comprising a band to abut against and follow the curvature of the rim of the wheel, grouters projecting outwardly from the band, and secured thereto, the rim having circumferential slots, members fixed on the band to project through the slots, and means whereby if the band is then rotated in one direction on the rim said band will be held against outward movement relative to the rim.

3. A structure as in claim 2, in which additional means is provided between said band and rim for then holding the band against retractive movement on the rim.

4. A grouter attachment for vehicle wheels comprising a band to abut against and follow the curvature of the rim of the wheel, grouters projecting outwardly from the band, means securing the grouters to the band, the rim having circumferential slots, said means being arranged to project through the slots, and L heads on the inner ends of said means of a shorter length than said slots and disposed longitudinally thereof whereby said heads may also be projected through the slots; said heads lying adjacent the inner face of the rim beyond the slots when the band is then turned on the rim.

5. A grouter attachment for vehicle wheels comprising a band to abut against and follow the curvature of the rim of the wheel, grouters projecting outwardly from the band, and secured thereto, the rim having circumferential slots, members fixed on the band to project through the slots, L heads on the inner ends of said members of a shorter length than said slots and disposed longitudinally thereof whereby said heads may also be projected through the slots; said heads lying adjacent the inner face of the rim beyond the slots when the band is then turned on the rim, and additional means applied to the band and rim for detachably preventing retractive movement of said members along the slots.

6. A grouter attachment for vehicle wheels comprising a band to abut against and follow the curvature of the rim of the wheel, grouters projecting outwardly from the band, and means on the band cooperating with the rim whereby if the latter is placed against the rim and then turned in one direction on the rim, said band will be automatically held from radial displacement and further rotative movement in the same direction.

7. A structure as in claim 6, in which additional means is detachably applied to the band and rim for then preventing retractive movement of the band.

8. A grouter attachment for vehicle wheels comprising a plurality of separate bands arranged to only partially surround the rim of a wheel, grouters projecting outwardly from the bands, and means applied to the bands and cooperating with the rim for enabling each band to be individually and detachably secured to the rim.

In testimony whereof I affix my signature.

JOHN M. CONLEY.